J. REGEN.
INTERMITTENT MOTION GEARING.
APPLICATION FILED JUNE 2, 1922.

1,432,494.

Patented Oct. 17, 1922.

Johannes Regen
INVENTOR
By Otto [illegible]
his ATTORNEY

J. REGEN.
INTERMITTENT MOTION GEARING.
APPLICATION FILED JUNE 2, 1922.

1,432,494.

Patented Oct. 17, 1922.
2 SHEETS—SHEET 2.

Johannes Regen
INVENTOR

By Otto Munk
his ATTORNEY.

Patented Oct. 17, 1922.

1,432,494

UNITED STATES PATENT OFFICE.

JOHANNES REGEN, OF VIENNA, AUSTRIA.

INTERMITTENT-MOTION GEARING.

Application filed June 2, 1922. Serial No. 565,400.

*To all whom it may concern:*

Be it known that I, JOHANNES REGEN, a subject of the Republic of Austria, residing at Vienna, IX./4, Grundlgasse Nr. 2, Austria, have invented certain new and useful Improvements in Intermittent-Motion Gearings (for which I have made application in Austria, A 3296-18, June 11, 1918; Germany, R 47461, April 9, 1919; and Czecho-Slovakia, P 1044-19, April 24, 1919), of which the following is a specification.

My invention relates to intermittent motion gearings of that class in which a toothed sector revolving round its geometrical axis is adapted to intermittently mesh with a toothed wheel, thereby imparting an intermittent rotary motion to the latter. In intermittent motion gearings of this class as heretofore constructed the toothed wheel is moved irregularly being moved each time the toothed sector meshes with it through an angle exceeding that of the toothed sector or corresponding to a greater number of teeth than the toothed sector actually has. Thus for instance if the toothed wheel has 16 teeth and the toothed sector has 4 teeth the toothed wheel does not move through an angle corresponding to 4 teeth for each revolution of the toothed sector, but through an angle corresponding to about 5 teeth. Consequently the toothed wheel does not make one revolution for four revolutions of the toothed sector, but one revolution and a quarter more or less. These irregularities of the movement of the toothed wheel are objectionable in various respects.

The object of my invention is to obviate this deficiency and with this object in view I build up according to my invention the toothed wheel as well as the toothed sector of a plurality of toothed discs located side by side, the distance between consecutive teeth in each of these discs being as many times that corresponding to the normal pitch as there are discs located side by side, the teeth of adjacent discs of both, the wheel and the sector, being displaced relatively to each other by angles corresponding to multiples of the normal pitch.

It has already been proposed to build up toothed wheels of toothed discs located side by side, the teeth of adjacent discs being displaced relatively to each other but the construction of these well known toothed wheels is quite different from that according to my invention and the object of the prior construction is only to prevent the meshing toothed wheels from axial displacement.

Figure 1:
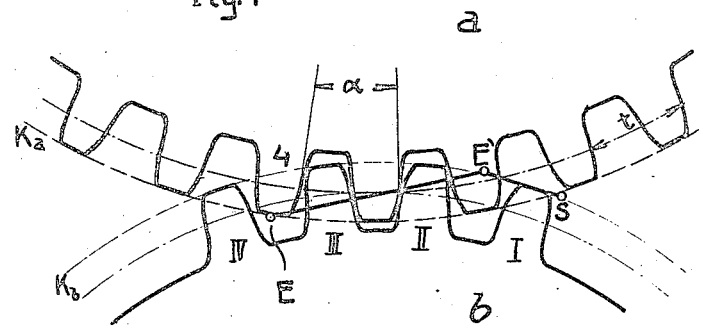
Figure 2:
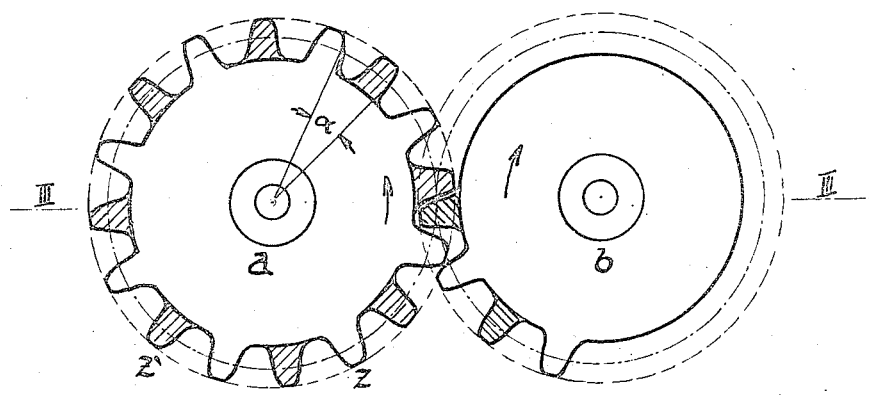
Figure 3:
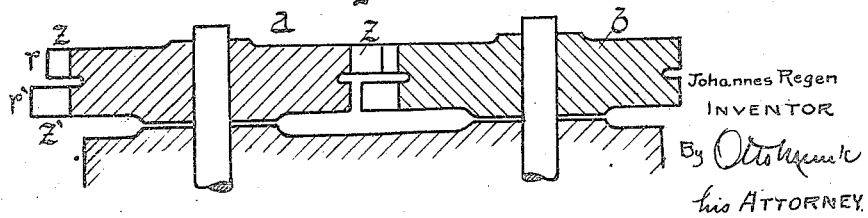

In the annexed drawings Fig. 1 illustrates diagrammatically for the sake of comparison an intermittent motion gearing of the class above referred to as hereinbefore constructed. Fig. 2 is a plan view of an embodiment of my improved gearing, Fig. 3 is a section on the line III—III of Fig. 2. Figs. 4 to 7 are plan views illustrating the operation of my improved gearing.

In the intermittent motion gearing as heretofore constructed and illustrated by Fig. 1 and consisting of a toothed wheel $a$ and a toothed sector $b$ the first tooth I of the sector and its following teeth II, III cause the toothed wheel $a$ to move forwards through a distance equal to the mesh line E E′ exceeding the length of the arc of the pitch angle $\alpha$; but as always two or more teeth of the toothed sector engage simultaneously with the toothed wheel $a$ practically each tooth I, II, III advances the toothed wheel $a$ only through the pitch angle $\alpha$; while the last tooth IV advances the wheel $a$ beyond the end E′ of the meshing line E E′ up to the point S of intersection of the two outer or head circles $K^a$, $K^b$, the outer edge of the sector tooth IV sliding along the side of the wheel tooth 4 while moving approximately from E to S. The length of the broken line E E′ S being greater than four times the pitch $t$ the toothed wheel $a$ is turned through an angle greater than the toothed angle of the sector $b$.

In the embodiment of my invention illustrated in Figs. 2 and 3 $a$ is again the toothed wheel and $b$ the toothed sector. The toothed wheel $a$ has 16 teeth and the sector $b$ has 4 teeth. According to my invention both the toothed wheel and the sector are built up of two toothed discs $r$ $r'$ having their teeth $z$ $z'$ displaced relatively to each other. The distance of consecutive teeth in each disc is equal to twice the pitch angle; the hatched teeth $z'$ of Fig. 2 are those of the lower disc $r'$ and the blank teeth $z$ are those of the upper disc $r$.

Figure 4:
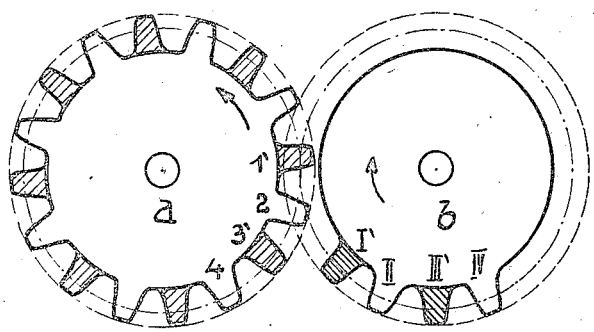
Figure 5:
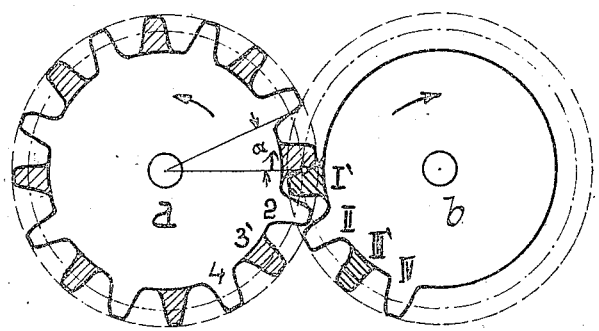
Figure 6:
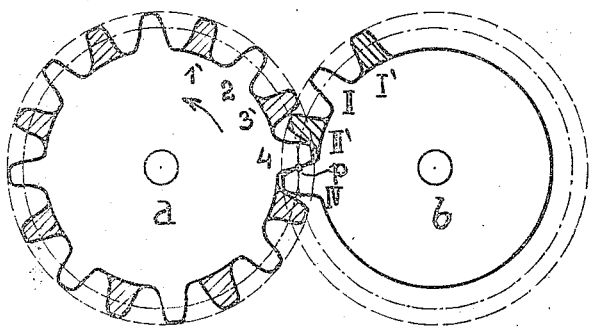

On starting from the position shown in Fig. 4 and rotating in the direction of the arrow the first lower tooth I′ of the sector $b$ enters between the lower teeth 1′ and 3′ of the toothed wheel $a$ without advancing the latter. The movement of the wheel $a$ begins at the moment when the lower tooth $z'$ strikes against the lower tooth 1' of the wheel at the point $p$ and then by the co-operation of the said lower teeth I' and 1' the toothed wheel is advanced through the pitch angle $\alpha$. Then the next following upper tooth II of the sector which comes into engagement with the upper tooth 2 of the wheel immediately after the advance of the wheel has been commenced by the engagement of the tooth I' and 1' and advances the wheel through another pitch angle $\alpha$ the first half of this advance taking place at the same time as the last half of the advance by the engagement of the teeth I' 1'. Thus the next lower tooth III' of the sector $b$ comes into engagement with the lower tooth 3' of the wheel $a$ and advances the latter through a further pitch angle $\alpha$ the first half of this advance taking place again at the same time as the second half of the advance due to the engagement of the teeth II and 2. Finally the upper tooth IV of the sector comes into engagement with the upper tooth 4 of the wheel and in the first half of its movement it advances together with the tooth III' the wheel until it reaches the position shown in Fig. 6 in which it contacts with the tooth 4 at the point $p$, which occupies the same position relatively to the axes of the wheel and the sector as the point $p$ in Fig. 7; thereupon the tooth IV advances the tooth 4 beyond the point E' of the meshing line up to the point S of intersection of the two outer or head circles of the teeth as shown in Fig. 7, the length of the broken line for E' S corresponding practically to the pitch angle $\alpha$.

Figure 7:
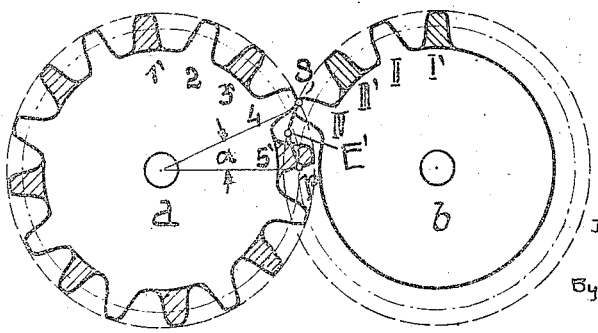

From the above described operation of my improved intermittent motion gearing it will be seen that for each revolution of the four toothed sector $b$ the toothed wheel $a$ is advanced through an angle corresponding to four teeth only, and that at the end of the movement of the wheel $a$ its fifth tooth 5' is exactly in the same position as its tooth 1' at the beginning of the advance as will be clearly seen on comparing Figs. 4 and 7. This regular forward movement of the wheel $a$ is due to the fact that the meshing line E, E' S of the gearings heretofore used Fig. 1 is reduced for the tooth I of the toothed sector $b$ to the broken line $p$ E' S which practically correspond to the pitch angle $\alpha$. By shortening the meshing line the excess in movement of the intermittent motion gearings of the class referred to as heretofore constructed due to the last tooth of the sector is done away with and consequently, in my improved gearing the toothed wheel advances each time exactly by so many teeth as there are on the toothed sector.

At the same time by this construction of the intermittent motion gearing most favourable meshing conditions are secured which prevent any clamping of the first sector tooth on its coming into engagement with the toothed wheel.

What I claim is:

1. In an intermittent motion gearing the combination of a toothed wheel and a toothed sector adapted to intermittently engage with such toothed wheel, the said wheel and sector being built up each of the same number of toothed discs located side by side, the angular distance between consecutive teeth of such discs being the same in the wheel and in the sector, and equal to as many times the normal pitch angle as there are discs located side by side in the wheel, adjacent discs of the wheel and of the sector being displaced relatively to each other by angles equal to multiples of the fraction of the angular distance between consecutive teeth of the discs divided by the number of discs in the wheel and in the sector.

2. In an intermittent motion gearing the combination of a toothed wheel and a toothed sector adapted to intermittently engage with such toothed wheel, the said wheel and sector being built up each of the same number of toothed discs located side by side, the angular distance between consecutive teeth of such discs being the same in the wheel and in the sector and equal to as many times the normal pitch angle as there are discs located side by side in the wheel, adjacent discs of the wheel and of the sector being displaced relatively to each other by angles equal to the fraction of the angular distance between consecutive teeth of the discs divided by the number of discs in the wheel and in the sector.

In testimony whereof I affix my signature in presence of two witnesses.

PROF. DR. JOHANNES REGEN.

Witnesses:
CARL VONDENBURG,
ALEXANDER SONN.